(12) United States Patent
Sun et al.

(10) Patent No.: US 7,829,045 B2
(45) Date of Patent: Nov. 9, 2010

(54) METHOD FOR PRODUCING LITHIUM COMPOSITE OXIDE FOR USE AS POSITIVE ELECTRODE ACTIVE MATERIAL FOR LITHIUM SECONDARY BATTERIES

(75) Inventors: Yang-Kook Sun, Seoul (KR); Sang-Ho Park, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 1348 days.

(21) Appl. No.: 10/553,881

(22) PCT Filed: Apr. 30, 2004

(86) PCT No.: PCT/KR2004/001006

§ 371 (c)(1),
(2), (4) Date: Oct. 21, 2005

(87) PCT Pub. No.: WO2004/097963

PCT Pub. Date: Nov. 11, 2004

(65) Prior Publication Data

US 2006/0222947 A1    Oct. 5, 2006

(30) Foreign Application Priority Data

Apr. 30, 2003    (KR) .................. 10-2003-0027867

(51) Int. Cl.
*C01B 13/00*    (2006.01)
(52) U.S. Cl. .............. 423/179.5; 423/594.4; 423/594.6; 423/599; 429/220; 429/221; 429/223; 429/224; 429/231.95; 429/231.1; 429/231.3

(58) Field of Classification Search .............. 423/179.5, 423/594.4, 594.6, 599; 429/220–224, 231.1, 429/231.3, 231.95
See application file for complete search history.

(56) References Cited

U.S. PATENT DOCUMENTS

| | | | | |
|---|---|---|---|---|
| 5,914,094 A | * | 6/1999 | Sun et al. .................. | 423/594.4 |
| 5,958,362 A | * | 9/1999 | Takatori et al. .......... | 423/593.1 |
| 5,980,786 A | * | 11/1999 | Yamashita et al. ....... | 252/518.1 |

FOREIGN PATENT DOCUMENTS

| | | | |
|---|---|---|---|
| JP | 11-278848 | * | 10/1999 |
| JP | 12-149923 | * | 5/2000 |

OTHER PUBLICATIONS

Wan, Chuan-yun et al. "*Property Improvement of Lithium Manganese Oxide for Lithium Ion Battery*," Jun. 30, 2002, Battery Bimonthly, vol. 32, S1, China Academinc Journal Electronic Publishing House, China.

* cited by examiner

*Primary Examiner*—Steven Bos
(74) *Attorney, Agent, or Firm*—Perkins Coie LLP

(57) ABSTRACT

Disclosed herein is a method for producing a lithium composite oxide for use as a positive electrode active material for lithium secondary batteries by a spray pyrolysis process. The method comprises the steps of: subjecting an inorganic acid salt solution of metal elements constituting a final composite oxide other than lithium to a spray pyrolysis process to obtain an intermediate composite oxide powder; and solid state-mixing the intermediate composite oxide powder and a hydroxide salt of lithium, followed by thermally treating the mixture.

14 Claims, 6 Drawing Sheets

(a)

(b)

(a)

(b)

(a)

(b)

(a)

(b)

(a)

(b)

(a)

(b)

METHOD FOR PRODUCING LITHIUM COMPOSITE OXIDE FOR USE AS POSITIVE ELECTRODE ACTIVE MATERIAL FOR LITHIUM SECONDARY BATTERIES

TECHNICAL FIELD

The present invention relates to a method for producing a metal composite oxide, and more particularly to a method for producing a lithium composite oxide for use as a positive electrode active material for lithium secondary batteries by a spray pyrolysis process.

BACKGROUND ART

As the distribution of power sources for portable electronic devices, such as mobile communication equipment for information communication, digital cameras and camcorders, has been increased in recent years, there is a sharply increasing global demand for secondary batteries as the power sources. In particular, since the portability of the portable electronic devices is largely affected by secondary batteries, there exists a strong need for high-performance secondary batteries.

The characteristics required for secondary batteries are determined by charge-discharge characteristics, cycle life characteristics, high-rate characteristics and thermal stability and the like. In view of the above-mentioned characteristics, lithium secondary batteries have drawn attention and are thus widely used at present.

In typical lithium secondary batteries, $LiCoO_2$ is used as a positive electrode material and carbon is used as a negative electrode material. Positive electrode materials researched and developed hitherto include $LiNiO_2$, $LiCo_xNi_{1-x}O_2$, $LiMn_2O_4$, etc. $LiCoO_2$ is excellent in terms of stable charge-discharge characteristics and constant discharge voltage characteristics, but disadvantageous in that cobalt (Co) is present in a relatively small amount in nature and is thus expensive, and toxic to humans. Since $LiNiO_2$ has problems of its difficult synthesis and poor thermal stability, it has not been put to practical use yet.

On the contrary, $LiMn_2O_4$ is the most widely used positive electrode material due to relatively low-price raw materials and easy synthesis. However, a spinel type of $LiMn_2O_4$ for 4V grade secondary batteries has a theoretical discharge capacity of about 148 mAh/g, which is lower in energy density than other positive electrode materials. In addition, since the spinel type of $LiMn_2O_4$ has a three-dimensional tunnel structure, the diffusion resistance during intercalation/deintercalation of lithium ions is high, the diffusion coefficient is low compared to $LiCoO_2$ and $LiNiO_2$ having a two-dimensional structure (or layered crystal structure), and the cycle life characteristics are poor due to a structural change (so-called 'Jahn-Teller distortion').

Thus, there is a need for a composite oxide having a layered crystal structure capable of solving the above problems, and at the same time, maintaining advantages of the manganese oxide. Generally, one equivalent amount of lithium present in a composite oxide having a layered crystal structure can participate in the charging and discharging, the composite oxide has a theoretical capacity of 285 mAh/g. In the case of $LiCoO_2$ and $LiNiO_2$, Li ions are diffused through the two-dimensional interlayer space, resulting in a high current density. It is thus expected to attain a high output.

In order to obtain powders of layered composite oxides and spinel type composite oxides mentioned above, a solid-state reaction process and a wet process are typically used.

The solid-state reaction process refers to a process wherein carbonates or hydroxides of each constituent element are mixed and then fired, the procedure being repeated several times. The solid-state reaction process has the following drawbacks: 1) when mixing, introduction of impurities from a ball-mill is large, 2) since a non-homogeneous reaction is likely to take place, an irregular phase is formed, 3) since control over the particle size of powder is difficult, sinterability is poor, and 4) high production temperature and long production time are required.

Unlike the solid-state reaction process, the wet process is a process wherein each constituent element is controlled in the atomic range, and includes ultrasonic spray pyrolysis. According to the ultrasonic spray pyrolysis, first, a lithium salt (e.g., lithium nitrate, lithium hydroxide, etc.), cobalt nitrate and nickel nitrate are dissolved, the resulting solution is ultrasonically sprayed and pyrolyzed to obtain a composite oxide powder of the desired shape, and the powder is thermally treated to produce a final positive electrode active material.

Despite the controllability of constituent elements in the atomic range, the ultrasonic spray pyrolysis has a problem in that when a lithium salt is used, the molar ratio of lithium to other metals in the final product is out of the preferred range (Li: ($Ni_{1/2}Mn_{1/2}$, $Ni_{1/3}Co_{1/3}Mn_{1/3}$)). In addition, since a series of steps, including solution evaporation and pyrolysis, are carried out within a short time, the thermal hysteresis is extremely low, as compared with other conventional fired materials, thus negatively affecting the crystal growth.

Owing to the above-mentioned problems, when the ultrasonic spray pyrolysis is used to produce a positive electrode active material for a lithium secondary battery, the crystal structure of the active material is destroyed according to increasing number of charge-discharge cycles of the lithium secondary battery, and the cycle life characteristics and capacity maintenance characteristics of the lithium secondary battery are steeply deteriorated.

DISCLOSURE

Therefore, the present invention has been made in view of the above problems, and it is an object of the present invention to provide a method for producing a novel composite oxide for use as a positive electrode active material for lithium secondary batteries, which allows the molar ratio of lithium (Li) and other metals present in the composite oxide to be maintained within a preferred range. Lithium secondary batteries manufactured using the composite oxide exhibit excellent charge-discharge cycle characteristics and capacity maintenance characteristics.

In order to accomplish the above objects of the present invention, there is provided a method for producing a lithium composite oxide for use as a positive electrode active material for lithium secondary batteries, comprising the steps of:

subjecting an inorganic acid salt solution of metal elements constituting a final composite oxide other than lithium to a spray pyrolysis process to obtain an intermediate composite oxide powder; and solid state-mixing the intermediate composite oxide powder and a hydroxide salt of lithium, followed by thermally treating the mixture.

The thermal treatment is performed in the temperature range of about 400~1000° C.

The inorganic acid salt solution includes at least one metal element selected from the group consisting of Al, Co, Cr, Fe, Mn, Ni, Mg, Cu and Sb, and preferably Co, Mn and Ni.

In a particular embodiment of the present invention, the inorganic acid salt solution is a mixed solution of $Mn(NO_3)_2 \cdot 4H_2O$ and $Ni(NO_3)_2 \cdot 6H_2O$. The intermediate composite oxide formed from the mixed solution is an oxide represented by $(Ni_{1/2}Mn_{1/2})O_{2+y}$. The final lithium composite oxide is an oxide represented by $Li_{1+x}(Ni_{1/2}Mn_{1/2})O_2$ (wherein $0 \leq x \leq 0.1$).

In another particular embodiment of the present invention, the inorganic acid salt solution is a mixed solution of $Ni(NO_3)_2 \cdot 6H_2O$, $Co(NO_3)_2 \cdot 6H_2O$ and $Mn(NO_3)_2 \cdot 4H_2O$. The intermediate composite oxide formed from the mixed solution is an oxide represented by $(Ni_{1/3}Co_{1/3}Mn_{1/3})O_{2+y}$. The final lithium composite oxide is an oxide represented by $Li_{1+x}(Ni_{1/3}Co_{1/3}Mn_{1/3})O_2$ (wherein $0<x<0.1$). It should be understood that any inorganic acid salts capable of producing the positive electrode active materials of $Li_{1+x}(Ni_{1/2}Mn_{1/2})O_2$ and $Li_{1+x}(Ni_{1/3}Co_{1/3}Mn_{1/3})O_2$ can be utilized, in addition to the above inorganic acid salts.

In further another particular embodiment of the present invention, The final lithium composite oxide is an oxide represented by $Li_{1+x}(M_yMn_{(2-y)})O_4$ (wherein $0 \leq x \leq 0.1$, $0 \leq y \leq 0.5$ and M is at least one selected from the group consisting of Al, Co, Cr, Fe, Ni, Mg, Cu and Sb).

The step of forming the intermediate composite oxide includes the sub-steps of: measuring the amount of inorganic acid salts of metal elements constituting the final composite oxide other than lithium in the stoichiometric ratio of the constituent metal elements; dissolving the inorganic acid salts in distilled water or alcohol, adding a chelating agent thereto, and stirring the mixture; and spraying the aqueous or alcoholic solution of the stirred mixture to form liquid droplets, and pyrolyzing the liquid droplets at about 400.about.1,000° C., to form the intermediate composite oxide.

The chelating agent used herein is selected from the group consisting of tartaric acid, citric acid, formic acid, glycolic acid, polyacrylic acid, adipic acid, glycine, amino acids and PVA. The pyrolysis is performed in a vertical pyrolysis furnace.

In accordance with another aspect of the present invention, there is provided a lithium composite oxide produced by said method. In accordance with yet another aspect of the present invention, there is provided a lithium secondary battery manufactured using the lithium composite oxide as a positive electrode active material.

DESCRIPTION OF DRAWINGS

The above and other objects, features and other advantages of the present invention will be more clearly understood from the following detailed description taken in conjunction with the accompanying drawings, in which.

BEST MODE

Figure 1:
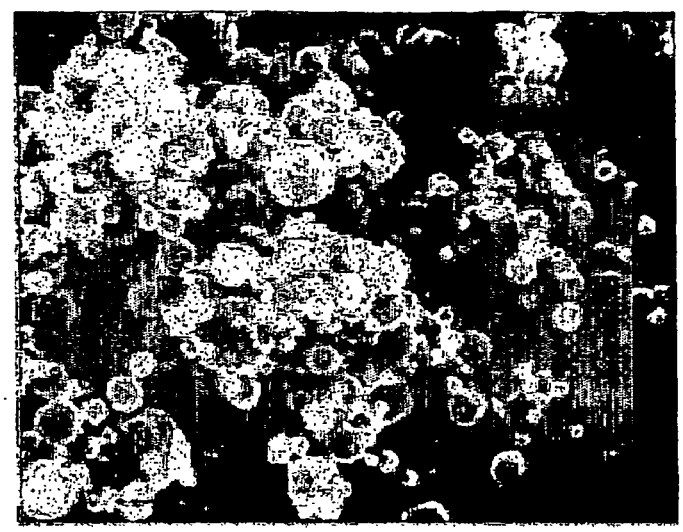
FIGS. 1a and 1b are a scanning electron microscopy (SEM) image and an XRD (X-ray diffraction) pattern of a lithium-free intermediate composite oxide powder, respectively, formed when carrying out one embodiment of the present invention.
Figure 1:
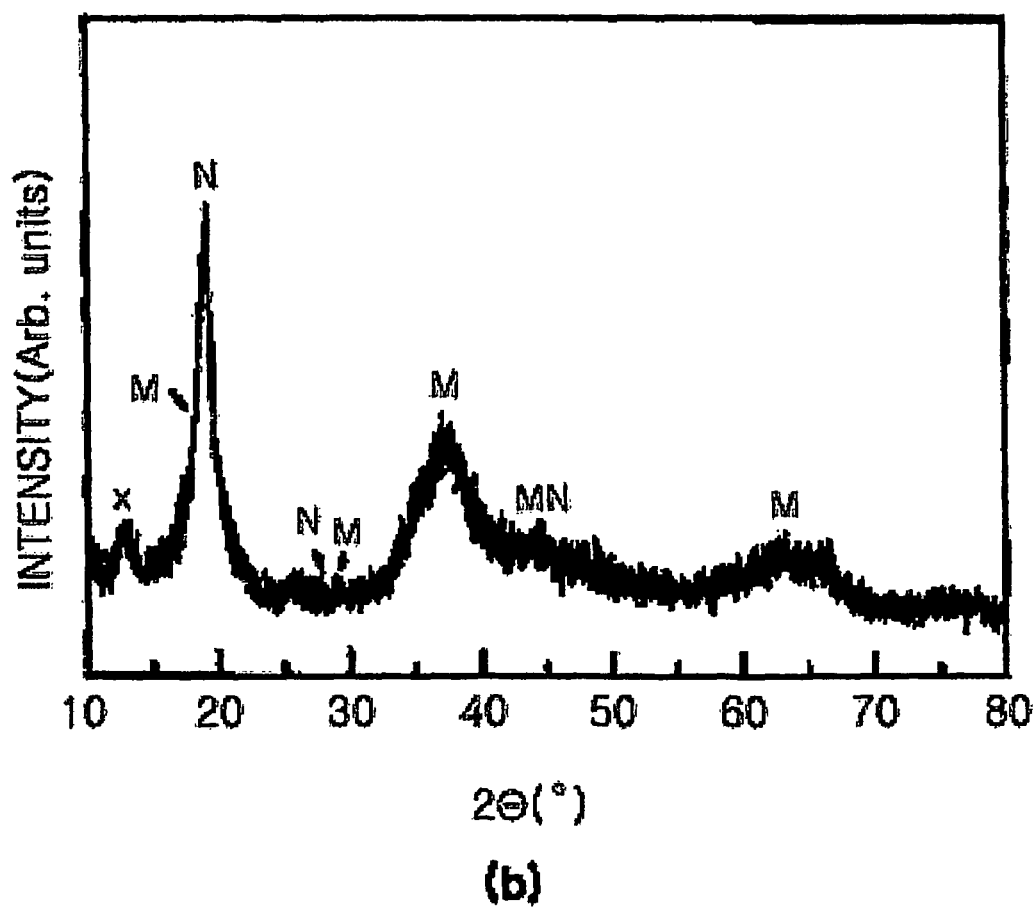

A method for producing a lithium composite oxide according to the present invention is a novel method capable of solving problems of non-homogeneous reaction caused by a solid-state reaction process and uncontrolled molar ratio of lithium by ultrasonic spray pyrolysis.

In particular, the present inventors found that when a solution of inorganic acid salts, including lithium, in the state of liquid droplets is passed through a furnace at high temperature in accordance with ultrasonic spray pyrolysis, the lithium is easily evaporated due to its low vapor pressure, which causes the following problems: 1) frequent occurrence of intercalation/deintercalation of lithium ions in the crystal structure of a final composite oxide, 2) low thermal hysteresis, 3) deterioration of the crystal growth, and 4) destruction of the crystal structure of a composite oxide as a positive electrode active material according to increasing number of charge-discharge cycles.

Based on this finding, the present inventors have earnestly and intensively conducted research to solve the above problems, and as a result, discovered that a lithium composite oxide in which the molar ratio of lithium to other constituent metal elements is stably maintained in the range of 1:1 to 1:1.1, can be produced by subjecting lithium-free inorganic acid salts to ultrasonic spray pyrolysis to form an intermediate composite oxide having a homogeneous composition, and subjecting the intermediate composite oxide and a hydroxide salt of lithium to a solid-state reaction process.

Since the lithium composite oxide thus produced has a constant lithium content, it exhibits a relatively high thermal hysteresis and has a stable crystal structure (layered structure, or polycrystalline structure including the layered structure). Indeed, lithium secondary batteries manufactured using the composite oxide as a positive electrode active material were shown to exhibit excellent capacity maintenance characteristics and cycle life characteristics.

The present invention will now be described in more detail with reference to the accompanying drawings illustrating preferred examples.

EXAMPLE 1

In order to produce $Li(Ni_{1/2}Mn_{1/2})O_2$ for use as a positive electrode active material for lithium secondary batteries, first, nickel nitrate hexahydrate ($Ni(NO_3) \cdot 6H_2O$, Aldrich, U.S.A) and manganese nitrate tetrahydrate ($Mn(NO_3) \cdot 4H_2O$, Sigma, U.S.A) were quantified and mixed so that the stoichiometric ratio of Ni to Mn was 1:1, and then the resulting mixture was dissolved in distilled water. 20% of citric acid monohydrate ($C_6H_8O_7 \cdot H_2O$, Aldrich, U.S.A) as a chelating agent, based on the total metal ions, was added to the solution, and stirred to prepare a mixed solution.

Subsequently, the mixed solution was sprayed using an ultrasonic vibrator operating at 1.7 MHz to form liquid droplets, and passed through a vertical pyrolysis furnace at 500° C. to obtain an intermediate composite oxide (($Ni_{1/2}Mn_{1/2}$)$O_{2+y}$) as a powder.

The scanning electron microscopy (SEM) image of the intermediate composite oxide powder is shown in FIG. 1a. As shown in FIG. 1a, the intermediate composite oxide was composed of spherical particles having a particle size of about 2~3 μm. Particularly, the particles of the intermediate composite oxide were observed to have a round shape like a plastic ball. FIG. 1b shows the XRD pattern of the intermediate composite oxide powder. Referring to the XRD pattern shown in FIG. 1b, the intermediate composite oxide exhibited a very low crystallinity, but was confirmed to be ($Ni_{1/2}Mn_{1/2}$)$O_{2+y}$, in which $Mn_3O_4$ and a small amount of NiO were dissolved.

The intermediate composite oxide (($Ni_{1/2}Mn_{1/2}$)$O_{2+y}$) was sufficiently mixed with lithium hydroxide dihydrate (LiOH.2H$_2$O)) and pulverized. The pulverized mixture was put in an aluminum container, and pyrolyzed at 900° C. for 20 hours to produce a layer-structured composite oxide ($Li_{1+x}$($Ni_{1/2}Mn_{1/2}$)$O_2$).

Figure 2:
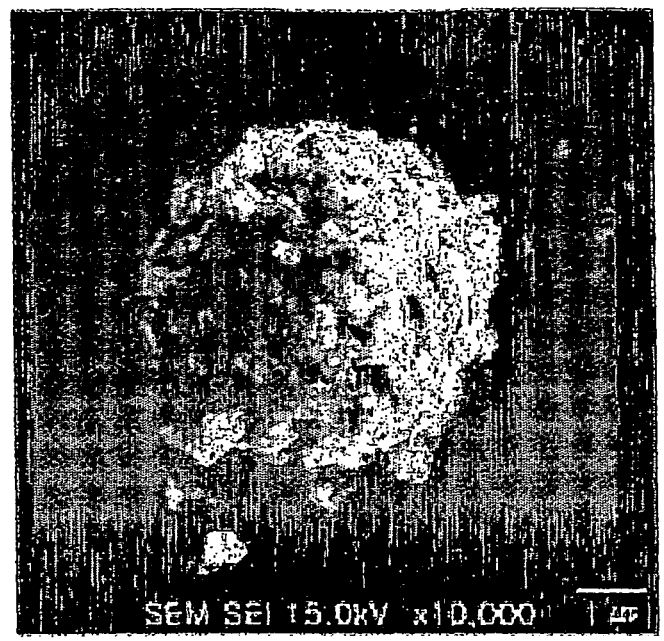
FIGS. 2a and 2b are a scanning electron microscopy (SEM) image and an XRD pattern of a lithium composite oxide, respectively, produced in accordance with one embodiment of the present invention.
Figure 2:
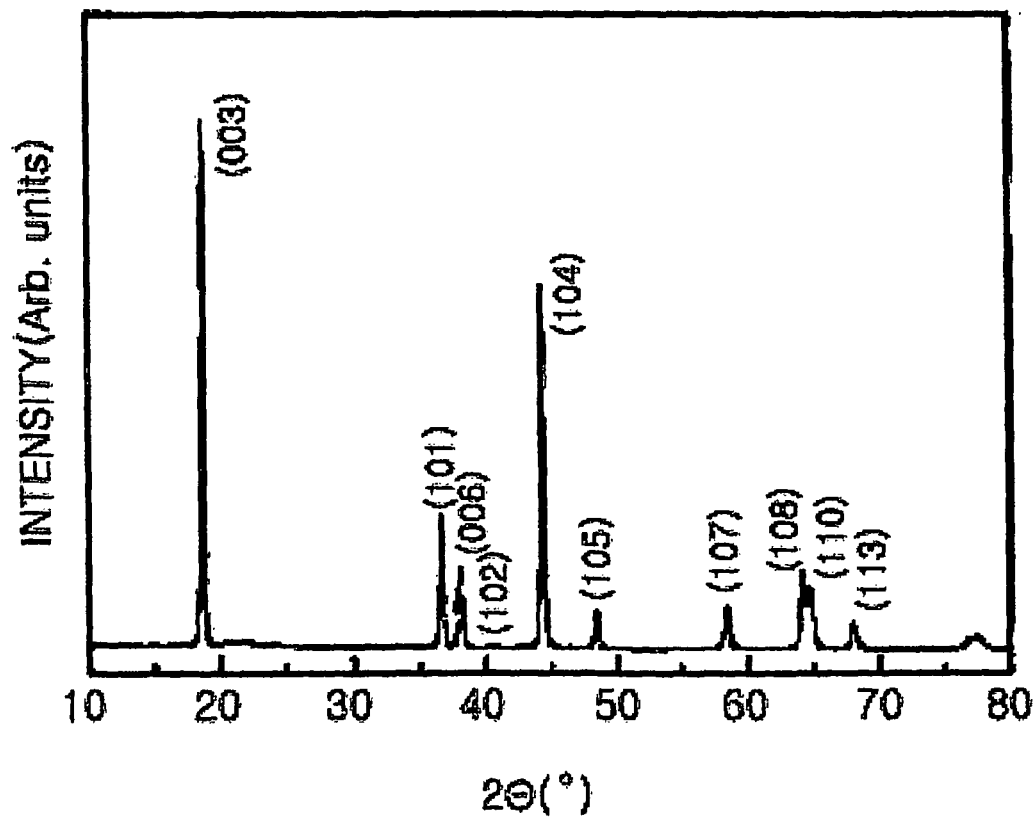

The scanning electron microscopy (SEM) image of the final lithium composite oxide is shown FIG. 2a. As shown in FIG. 2a, the final composite oxide powder was composed of spherical particles (about 2 μm) consisting of small spherical particles (about 200 nm). FIG. 2b shows the XRD pattern of the final composite oxide. Referring to the XRD pattern shown in FIG. 2b, all peaks indicate that the final composite oxide has a hexagonal α-NaFeO$_2$ structure belonging to space group R3m and has excellent crystallinity. In conclusion, it was confirmed that the final composite oxide is Li($Ni_{1/2}Mn_{1/2}$)$O_2$ having a single-layered crystal structure. According to the Rietveld method, lattice constants a and c of Li($Ni_{1/2}Mn_{1/2}$)$O_2$ were calculated to be 2.880? and 14.276?, respectively.

EXAMPLE 2

In this example, three lithium coin cells were manufactured using the layer-structured composite oxide (Li($Ni_{1/2}Mn_{1/2}$)$O_2$) produced in Example 1 as a positive electrode active material, and then the performance of the coin cells was evaluated.

First, 20 mg of Li($Ni_{1/2}Mn_{1/2}$)$O_2$ was homogeneously mixed with 8 mg of Teflon-acetylene black (TAB) and 4 mg of graphite, uniformly pressed on a stainless steel mesh under pressure of 1 ton, and dried at 100° C. to fabricate a positive electrode.

The positive electrode fabricated above, a negative electrode (Cyprus Foote Mineral) composed of a lithium foil as counter electrode, a separator composed of a porous polyethylene membrane (Celgard LLC.) having a thickness 25 μm, and a solution of 1M LiPF$_6$ in a mixed solvent of ethylene carbonate (EC) and dimethyl carbonate (DEC) (1:1 (v/v)) as an electrolyte, were used to manufacture three 2032 coin cells in which the separator was interposed between the positive electrode and the counter electrode, in accordance with a conventional manufacturing process. The charging and discharging of the three coin cells were performed under various voltage ranges of 2.8V~4.3V, 2.8~4.4V and 2.8~4.5V, respectively, at a current density of 0.2 mA/cm$^2$ at 30° C. using an electrochemical analysis apparatus (Toyo, Japan, Toscat 3000U).

Figure 3:
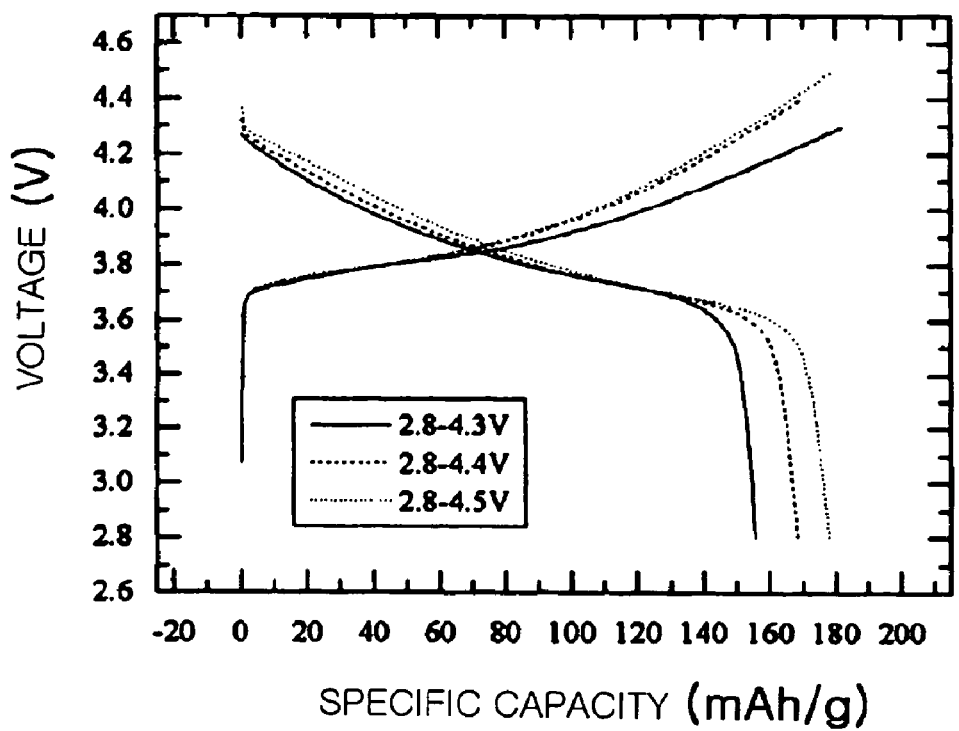
FIGS. 3a and 3b are graphs showing changes in the charge-discharge voltage and the discharge capacity according to increasing number of cycles, respectively, of a lithium secondary battery manufactured using a lithium composite oxide produced in accordance with one embodiment of the present invention.
Figure 3:
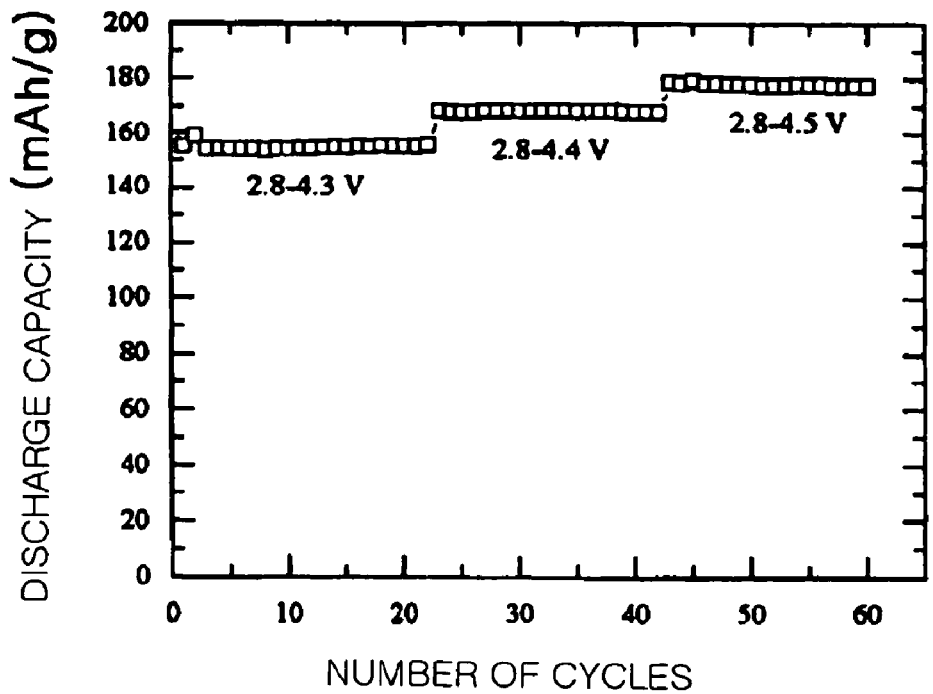

The measurement results are shown in FIGS. 3a and 3b. FIG. 3a is a graph showing the voltage-current characteristic (V-I characteristic) of the coin cells manufactured using the lithium composite oxide Li($Ni_{1/2}Mn_{1/2}$)$O_2$ as a positive electrode active material. FIG. 3b is a graph showing the cycle life characteristics of the coin cells.

Referring to FIG. 3a, the voltage curves of the three coin cells under different voltage ranges were very flat. In particular, it was observed that the charge-discharge curve was maintained at a voltage as high as 4.5V. In addition, the coin cell under a voltage range of 2.8~4.4V showed about an irreversible capacity ($C_{dis}/C_{cha}$) of about 14% at the first measurement, which is lower as compared with a coin cell manufactured using layered composite oxide Li[$Li_{(1-2x)/3}Ni_xMn_{(2-x)/3}$]$O_2$ produced by a conventional method.

Meanwhile, referring to FIG. 3b, the positive electrodes composed of Li($Ni_{1/2}Mn_{1/2}$)$O_2$ produced in accordance with the present invention exhibited discharge capacities as high as 155, 166 and 177 mA/cm$^2$ under the respective voltage ranges. The coin cells exhibited excellent cycle life characteristics without any decrease in the capacity even after 50 repetitions of charge-discharge cycles. Accordingly, it could be confirmed that any intercalation/deintercalation of lithium, indicating a structural change, did not occur in Li($Ni_{1/2}Mn_{1/2}$)$O_2$ as a positive electrode active material produced in accordance with the present invention despite repeated charge-discharge cycles.

EXAMPLE 3

In order to produce Li($Ni_{1/2}Mn_{1/2}$)$O_2$ for use as a positive electrode active material for lithium secondary batteries, first, nickel nitrate hexahydrate (Ni(NO$_3$).6H$_2$O, Aldrich, U.S.A), cobalt nitrate hexahydrate (Co(NO$_3$).6H$_2$O, Aldrich, U.S.A) and manganese nitrate tetrahydrate (Mn(NO$_3$).4H$_2$O, Sigma, U.S.A) were quantified and mixed so that the stoichiometric ratio of Ni, Co and Mn was 1:1:1, and then the resulting mixture was dissolved in distilled water. 20% of citric acid monohydrate (C$_6$H$_8$O$_7$.H$_2$O, Aldrich, U.S.A) as a chelating agent, based on the total metal ions, was added to the solution, and stirred to prepare a mixed solution.

Subsequently, the mixed solution was sprayed using an ultrasonic vibrator operating at 1.7 MHz to form liquid droplets in the same manner as in Example 1, and passed through a vertical pyrolysis furnace at 500° C. to obtain an intermediate composite oxide ($Ni_{1/3}Co_{1/3}Mn_{1/3}$)$O_{2+y}$ as a powder.

Figure 4:
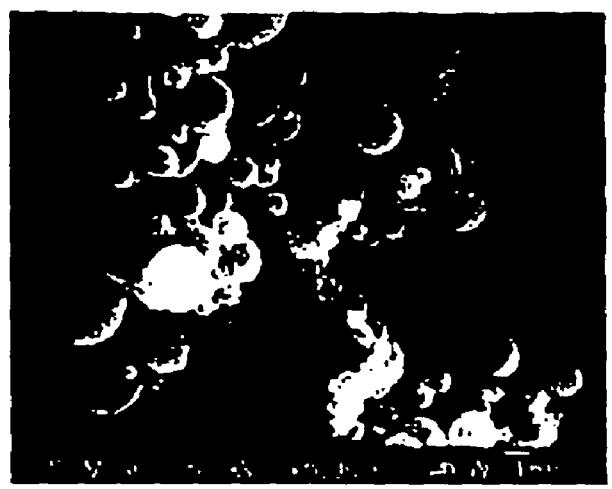
FIGS. 4a and 4b are a scanning electron microscopy (SEM) image and an XRD pattern of a lithium-free intermediate composite oxide powder, respectively, formed when carrying out another embodiment of the present invention.
Figure 4:
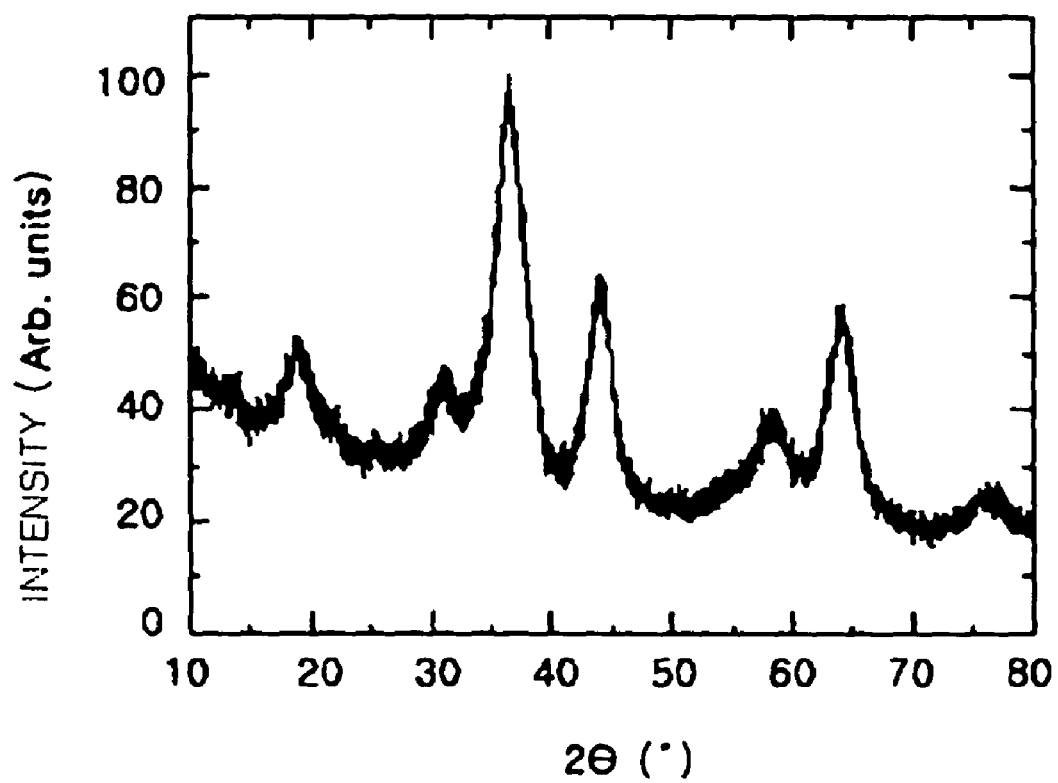

The scanning electron microscopy (SEM) image of the intermediate composite oxide powder is shown in FIG. 4a. As shown in FIG. 4a, the intermediate composite oxide was composed of spherical particles having a particle size of about 2~3 μm. Particularly, the particles of the intermediate composite oxide were observed to have a round shape like a plastic ball.

FIG. 4b shows the XRD pattern of the intermediate composite oxide powder. Referring to the XRD pattern shown in FIG. 4b, the intermediate composite oxide exhibited a very low crystallinity, but was confirmed to be ($Ni_{1/3}Co_{1/3}Mn_{1/3}$)$O_{2+y}$, in which $Mn_3O_4$, CoO and a small amount of NiO were dissolved.

The intermediate composite oxide ($Ni_{1/3}Co_{1/3}Mn_{1/3}$)$O_{2+y}$ was sufficiently mixed with lithium hydroxide dihydrate (LiOH.2H$_2$O)) and pulverized. The pulverized mixture was put in an aluminium container, and pyrolyzed at 900° C. for 20 hours to produce a layer-structured composite oxide (Li($Ni_{1/3}Co_{1/3}Mn_{1/3}$)$O_2$).

Figure 5:
FIGS. 5a and 5b are a scanning electron microscopy (SEM) image and an XRD pattern of a lithium composite oxide, respectively, produced in accordance with another embodiment of the present invention.
Figure 5:
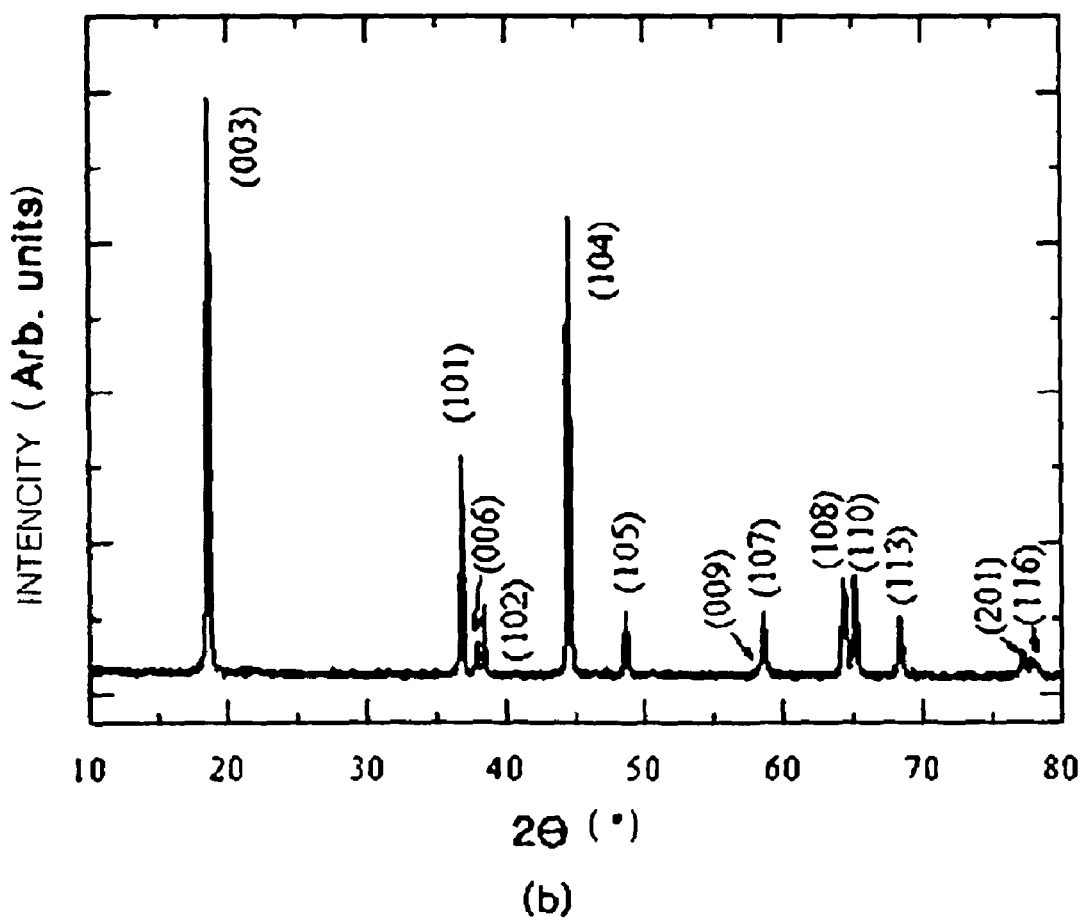

The scanning electron microscopy (SEM) image of the final lithium composite oxide is shown FIG. 5a. As shown in FIG. 5a, the final composite oxide powder was composed of polycrystalline bodies (about 500 μm) consisting of spherical particles (about 10~50 nm). The crystal structure of the composite oxide powder is very different from that of single-crystalline powders produced by common solid-state sintering or sol-gel processes.

FIG. 5b shows the XRD pattern of the final composite oxide. Referring to the XRD pattern shown in FIG. 5b, all peaks indicate that the final composite oxide (Li(Ni$_{1/3}$Co$_{1/3}$Mn$_{1/3}$)O$_2$) has a mixed structure of a spinel structure and a layered hexagonal structure.

EXAMPLE 4

In this example, four lithium coin cells were manufactured using the layer-structured composite oxide (Li(Ni$_{1/3}$Co$_{1/3}$Mn$_{1/3}$)O$_2$) produced in Example 3 as a positive electrode active material, and then the performance of the lithium coin cells was evaluated.

The charging and discharging of the four coin cells were performed under various voltage ranges of 2.8V~4.3V, 2.8~4.4V, 2.8~4.5V and 2.8~4.6V, respectively, at a current density of 0.2 mA/cm$^2$ at 30° C. using an electrochemical analysis apparatus (Toyo, Japan, Toscat 3000U).

Figure 6:
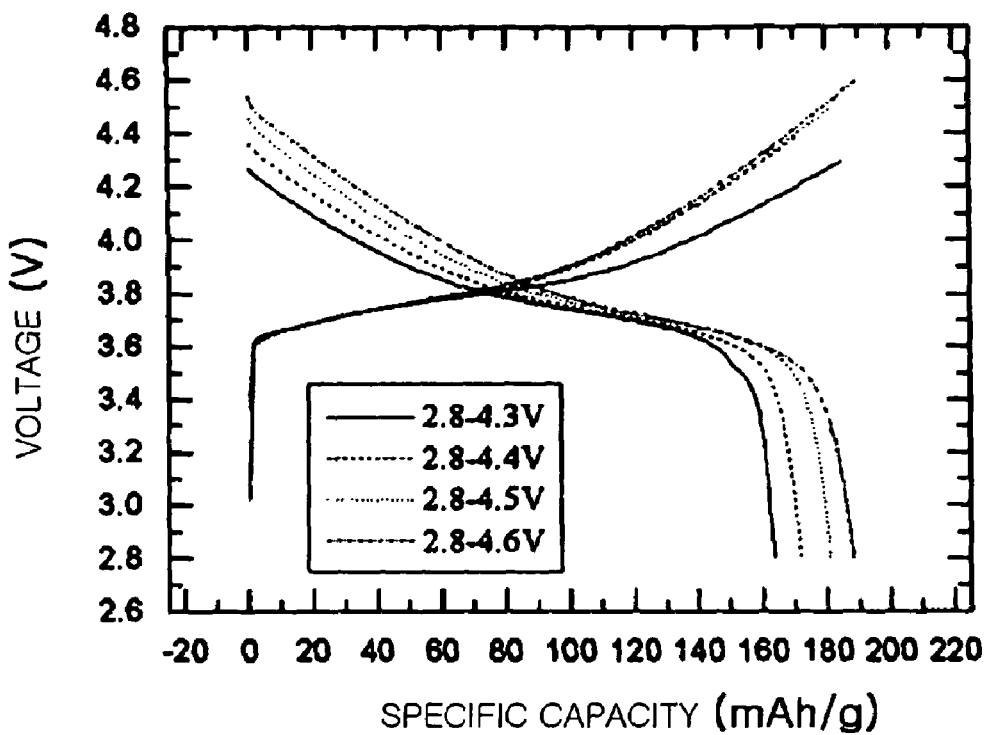
FIGS. 6a and 6b are graphs showing changes in the charge-discharge voltage and the discharge capacity according to increasing number of cycles, respectively, of a lithium secondary battery manufactured using a lithium composite oxide produced in accordance with another embodiment of the present invention.
Figure 6:
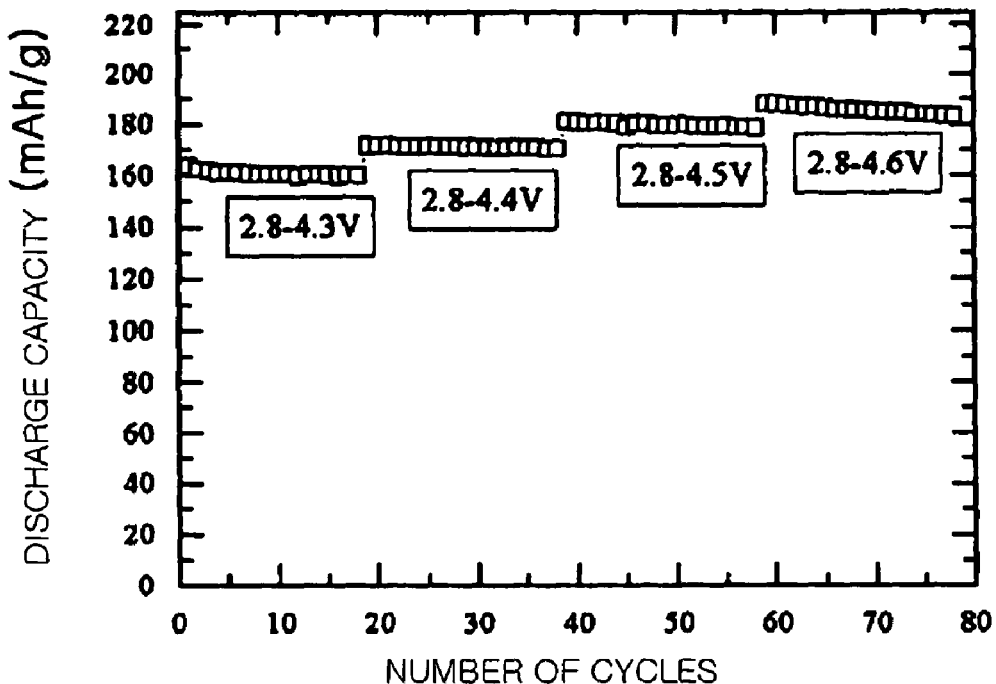

The measurement results are shown in FIGS. 6a and 6b. FIG. 6a is a graph showing the voltage-current characteristic (V-I characteristic) of the coin cells manufactured using the lithium composite oxide Li(Ni$_{1/3}$Co$_{1/3}$Mn$_{1/3}$)O$_2$ as a positive electrode active material. FIG. 6b is a graph showing the cycle life characteristics of the coin cells.

Referring to FIG. 6a, the voltage curves of the four coin cells under different voltage ranges were very flat. In particular, it was observed that the charge-discharge curves were maintained in the voltage range of 2.8~4.6V.

Meanwhile, referring to FIG. 6b, the positive electrodes composed of Li(Ni$_{1/3}$Co$_{1/3}$Mn$_{1/3}$)O$_2$ produced in accordance with the present invention exhibited discharge capacities as high as 163, 171, 181 and 188 mA/cm$^2$ under the respective voltage ranges. The coin cells exhibited excellent cycle life characteristics without any decrease in the capacity even after 50 repetitions of charge-discharge cycles. Accordingly, it could be confirmed that any intercalation/deintercalation of lithium indicating a structural change, did not occur in Li(Ni$_{1/3}$Co$_{1/3}$Mn$_{1/3}$)O$_2$ as a positive electrode active material produced in accordance with the present invention despite repeated charge-discharge cycles.

The present method can be applied to the method of producing the spinel structured lithium composite oxide represented by Li$_{1+x}$(M$_y$Mn$_{(2-y)}$)O$_4$ (wherein $0 \leq x \leq 0.1$, $0 \leq y \leq 0.5$ and M is at least one selected from the group consisting of Al, Co, Cr. Fe, Ni, Mg, Cu and Sb).

More specifically, the method of producing the spinel structured lithium composite oxide may comprises the steps of subjecting an inorganic acid salt solution of Mn and at least one metal element selected constituting a final composite oxide other than lithium and Mn to a spray pyrolysis process to obtain an intermediate composite oxide powder and solid state-mixing the intermediate composite oxide powder and a hydroxide salt of lithium followed by thermally treating the mixture. The starting inorganic acid salt solution may be the mixed solution of manganese nitrate (Mn(NO$_3$)) and at least one of cobalt nitrate, magnesium nitrate, copper nitrate, iron nitrate, chrome nitrate and cobalt nitrate. The final lithium composite oxide may includes Li$_{1.06}$Mn$_2$O$_4$, Li$_{1.06}$(Ni$_{0.5}$Mn$_{1.5}$)O$_4$, Li$_{1.06}$(Mg$_{0.5}$Mn$_{1.5}$)O$_4$, Li$_{1.06}$(Fe$_{0.5}$Mn$_{1.5}$)O$_4$, Li$_{1.06}$(Cr$_{0.5}$Mn$_{1.5}$)O$_4$ and Li$_{1.06}$(Co$_{0.5}$Mn$_{1.5}$)O$_4$.

As described above, according to the method of the present invention, a lithium composite oxide in which the molar ratio of lithium to other constituent metal elements is stably maintained in the optimum range, can be produced by subjecting lithium-free inorganic acid salts to ultrasonic spray pyrolysis to form an intermediate composite oxide having a homogeneous composition, and subjecting the intermediate composite oxide and a hydroxide salt of lithium to a solid-state reaction process. The lithium composite oxide thus produced has a stable crystal structure and exhibits a high thermal hysteresis.

In particular, lithium secondary batteries manufactured using the lithium composite oxide as a positive electrode active material show excellent capacity maintenance characteristics and cycle life characteristics.

INDUSTRIAL APPLICABILITY

As apparent from the foregoing, the composite oxide produced in accordance with the present invention can be used to manufacture lithium secondary batteries having excellent capacity maintenance characteristics and cycle life characteristics. In addition, the composite oxide can be used to manufacture lithium secondary batteries for portable electronic devices, e.g., mobile communication equipment for information communication, digital cameras and camcorders.

The present invention has been described herein with reference to the preferred embodiments and accompanying drawings. These embodiments and drawings do not serve to limit the invention, but are set forth for illustrative purposes. The scope of the invention is defined by the claims that follow.

Those skilled in the art will appreciate that various modifications, additions and substitutions are possible, without departing from the scope and spirit of the invention as disclosed in the accompanying claims.

The invention claimed is:

1. A method for producing a lithium composite oxide for use as a positive electrode active material for lithium secondary batteries, comprising the steps of:
    forming an intermediate composite oxide powder by subjecting an inorganic acid salt solution of metal elements constituting a final composite oxide other than lithium to spray pyrolysis; and
    solid state-mixing the intermediate composite oxide powder and a hydroxide salt of lithium, followed by thermally treating the mixture.

2. The method according to claim 1, wherein the inorganic acid salt solution includes at least one metal element selected from the group consisting of Al, Co, Cr, Fe, Ni, Mn, Mg, Cu and Sb.

3. The method according to claim 2, wherein the inorganic acid salt solution includes at least one metal element selected from the group consisting of Co, Mn and Ni.

4. The method according to claim 1, wherein the inorganic acid salt solution is a mixed solution of Mn(NO$_3$)$_2$-4H$_2$O and Ni(NO$_3$)$_2$.6H$_2$O.

5. The method according to claim 4, wherein the intermediate composite oxide is an oxide represented by (Ni$_{1/2}$Mn$_{1/2}$)O$_{2+y}$.

6. The method according to claim 1 or 5, wherein the lithium composite oxide is an oxide represented by Li$_{1+x}$(Ni$_{1/2}$Mn$_{1/2}$)O$_2$, wherein $0 \leq x \leq 0.1$.

7. The method according to claim 1, wherein the inorganic acid salt solution is a mixed solution of Ni(NO$_3$)$_2$ 6H$_2$O, Co(NO$_3$) 6H$_2$O and Mn(NO$_3$)$_2$ 4H$_2$O.

8. The method according to claim 1, wherein the intermediate composite oxide is an oxide represented by $(Ni_{1/3}Co_{1/3}Mn_{1/3})O_{2+y}$.

9. The method according to claim 1 or 8, wherein the lithium composite oxide is an oxide represented by $Li_{1+x}(Ni_{1/3}Co_{1/3}Mn_{1/3})O_2$ wherein $0 \leq x \leq 0.1$.

10. The method according to claim 1, wherein the final lithium composite oxide is an oxide represented by $Li_{1+x}(M_yMn_{(2-y)})O_4$, wherein $0 \leq x \leq 0.1$, $0 \leq y \leq 0.5$ and M is at least one selected from the group consisting of Al, Co, Cr, Fe, Ni, Mg, Cu and Sb.

11. The method according to claim 1, wherein the step of forming the intermediate composite oxide powder includes the sub-steps of:

measuring the amount of inorganic acid salts of metal elements constituting the final composite oxide other than lithium in the stoichiometric ratio of the constituent metal elements;

dissolving the inorganic acid salts in distilled water or alcohol, adding a chelating agent thereto, and stirring the mixture; and spraying the aqueous or alcoholic solution of the stirred mixture to form liquid droplets, and pyrolyzing the liquid droplets at about 400¯1,000° C., to form the intermediate composite oxide.

12. The method according to claim 11, wherein the chelating agent is selected from the group consisting of tartaric acid, citric acid, formic acid, glycolic acid, polyacrylic acid, adipic acid, glycine, amino acids and polyvinyl acetate.

13. The method according to claim 11, wherein the pyrolysis is performed in a vertical pyrolysis furnace.

14. The method according to claim 1, wherein the thermal treatment is performed in the temperature range of about 400¯1000° C.

* * * * *